United States Patent [19]
Baek

[11] Patent Number: 6,016,165
[45] Date of Patent: Jan. 18, 2000

[54] VERTICAL COMPRESSION CIRCUIT FOR AN IMAGE PLAYBACK SYSTEM

[75] Inventor: Seung-Ung Baek, Kyungki-do, Rep. of Korea

[73] Assignee: Samsung Electronics Co., Ltd., Kyungki-do, Rep. of Korea

[21] Appl. No.: 08/865,836

[22] Filed: May 30, 1997

[30] Foreign Application Priority Data

May 31, 1996 [KR] Rep. of Korea ............... 96/19232

[51] Int. Cl.[7] .................................................. H04N 07/01
[52] U.S. Cl. .................... 348/441; 348/392; 348/443; 348/448; 348/701
[58] Field of Search ............................ 348/392, 441, 348/443, 445, 446, 448, 701

[56] References Cited

U.S. PATENT DOCUMENTS

| | | | |
|---|---|---|---|
| 5,355,328 | 10/1994 | Arbeiter et al. | 348/445 |
| 5,534,934 | 7/1996 | Katsumata et al. | 348/445 |
| 5,668,602 | 9/1997 | Sid-Ahmed | 348/448 |
| 5,734,434 | 3/1998 | Kettenis | 348/445 |

*Primary Examiner*—Anand S. Rao
*Attorney, Agent, or Firm*—Sughrue, Mion, Zinn Macpeak & Seas, PLLC

[57] ABSTRACT

A vertical compression circuit of an image playback system displaying an image through interlaced scanning includes: a mode counter for counting horizontal lines within one section of vertical lines based on a compression mode signal and outputting a count; a coefficient selection signal generating unit for outputting a coefficient selection signal for selecting first and second filtering coefficients and for outputting a feedback control signal, based on the compression mode signal; a first coefficient selecting unit for generating first coefficients corresponding to various compression modes and outputting one of the first coefficients based on the first coefficient selection signal; a second coefficient selecting unit for generating second coefficients corresponding to various compression modes and outputting one of the second coefficients based on the second coefficient selection signal; an adder for adding the second coefficient output from the second coefficient selecting unit to one of zero and a feedback value, based on the feedback signal to produce a sum; a line memory unit for storing the output from the adder, wherein the adder outputs the second coefficient output from the second coefficient selecting unit if the feedback signal indicates no feedback, and the adder outputs the sum of the second coefficient output from the second coefficient selecting unit and a value previously stored in the line memory if the feedback signal indicates feedback; and a unit for adding the contents of the line memory unit and the output of the first coefficient selecting unit, and outputting a result.

11 Claims, 3 Drawing Sheets

VERTICAL COMPRESSION CIRCUIT FOR AN IMAGE PLAYBACK SYSTEM

BACKGROUND OF THE INVENTION

1. Field of the Invention

This invention relates to a circuit for horizontally and vertically compressing image signals in an image playback system. Specifically, the invention is directed to a circuit which continually compresses image signals in the form of interlaced scans, even though the image signals are input in the form of progressive scans, wherein the circuit has a simple hardware construction.

The present application is based on Korean Patent Application No. 19232/1996 which is incorporated herein by reference for all purposes.

2. Description of the Related Art

Generally, image playback systems having functions such as a double window, picture-in-picture (PIP), and multichannel, include a compression filter which is a compression circuit for compressing the horizontal and vertical lines of image signals.

FIG. 1 is a block diagram of a prior art vertical compression circuit. This vertical compression circuit includes an analog to digital converter (ADC) 2 for converting an analog image signal input into a digital image signal, a full adder 4 for outputting data after full-adding the output of the ADC 2 and other input data, a line memory 6 for storing the output of the full adder 4, and a selector 8 for controlling the output of line memory 6.

The structure of the compression filter of FIG. I can be represented by the expression "$d_{n-1} \cdot h_{n-1} + d_n \cdot h_n + d_{n+1} \cdot h_{n+1}$". The variable "h" (i.e., $h_{n-1}$, $h_n$, $h_{n+1}$) represents the transfer function. Here, the data $d_{n+1}$ at line n+1 is stored as $d_{n+1} \cdot h_{n+1}$ after being multiplied by $h_{n+1}$. The data $d_n$ at line n is added to $d_{n+1} \cdot h_{n+1}$ after being multiplied by $h_n$, and the sum $h_{n+1} \cdot d_{n+1} + h_n \cdot d_n$ is stored in line memory 6. The data $d_{n-1}$ is multiplied by $h_{n-1}$ and the result is added to the above sum, and the data $h_{n+1} \cdot d_{n+1} + h_n \cdot d_n + h_{n-1} \cdot d_{n-1}$ is stored in an external memory (not shown in the drawings) after being stored in line memory 6.

However, the conventional compression circuit described above has only one image data compression mode, namely a "⅓" compression mode, and it is difficult to extend the compression mode to execute various other compression modes. In cases where image data is progressively input, it must be progressively displayed causing picture tremor during playback.

SUMMARY OF THE INVENTION

An object of the present invention is to provide a compression circuit applicable to various compression modes, and to output image data in an interlaced scan format even though the data is received in a progressive scan format.

Another object is to provide a vertical filter for efficiently performing various types of vertical compressions such as for double windows and multi-PIPs, and for outputting the display data in an interlaced scan format.

In order to achieve the objectives of the present invention a vertical compression circuit of an image playback system displaying an image through interlaced scanning is provided which includes: a mode counter for counting horizontal lines within one section of vertical lines based on a compression mode signal and outputting a count; a coefficient selection signal generating unit for outputting a coefficient selection signal for selecting first and second filtering coefficients and for outputting a feedback control signal, based on the compression mode signal; a first coefficient selecting unit for generating first coefficients corresponding to various compression modes and outputting one of the first coefficients based on the first coefficient selection signal; a second coefficient selecting unit for generating second coefficients corresponding to various compression modes and outputting one of the second coefficients based on the second coefficient selection signal; an adder for adding the second coefficient output from the second coefficient selecting unit to one of zero and a feedback value, based on the feedback signal to produce a sum; a line memory unit for storing the output from the adder, wherein the adder outputs the second coefficient output from the second coefficient selecting unit if the feedback signal indicates no feedback, and the adder outputs the sum of the second coefficient output from the second coefficient selecting unit and a value previously stored in the line memory if the feedback signal indicates feedback; and a unit for adding the contents of the line memory unit and the output of the first coefficient selecting unit, and outputting a result.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
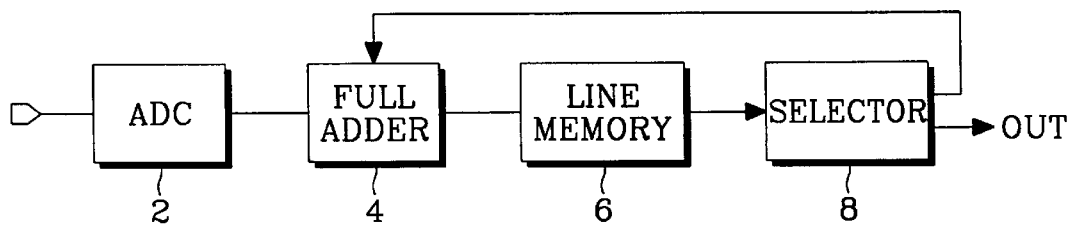
FIG. 1 is a block diagram of a prior art vertical compression circuit of an image playback system.

A preferred embodiment of the present invention is described below in detail with reference to the attached drawings. In the drawings, there appear many particular details for executing a vertical compression function according to the present invention, which are disclosed in order to assist in providing a general understanding of the present invention. However, it is recognized that a person of ordinary skill in the art would understand that the present invention can be embodied without employing the specific details disclosed herein, and would understand that the scope of the invention is not limited by those details.

Figure 2:
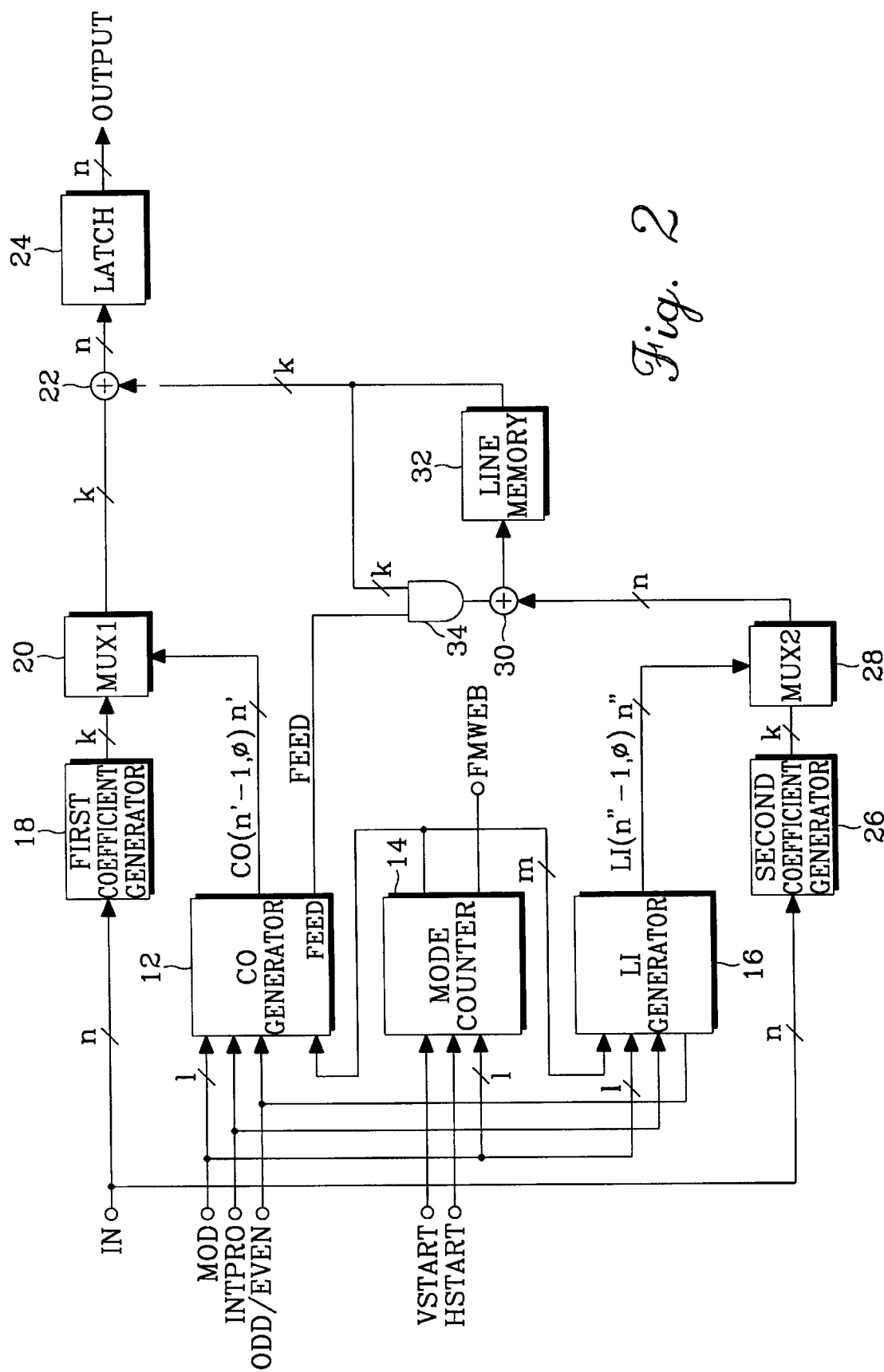
FIG. 2 is a block diagram of a vertical compression circuit according to the preferred embodiment of the present invention.

An apparatus according to the present invention is shown in FIG. 2. In FIG. 2 MOD indicates a compression mode signal specifying a vertical compression mode. A scanning selection signal INTPRO has a value of "1" when indicating interlaced scanning, and "0" when indicating progressive scanning. The ODD/EVEN input is a signal indicating an odd or even field. The signal VSTART is a signal for controlling a start of a vertical register, and the signal HSTART is a signal for controlling a start of a horizontal register.

Figure 3:
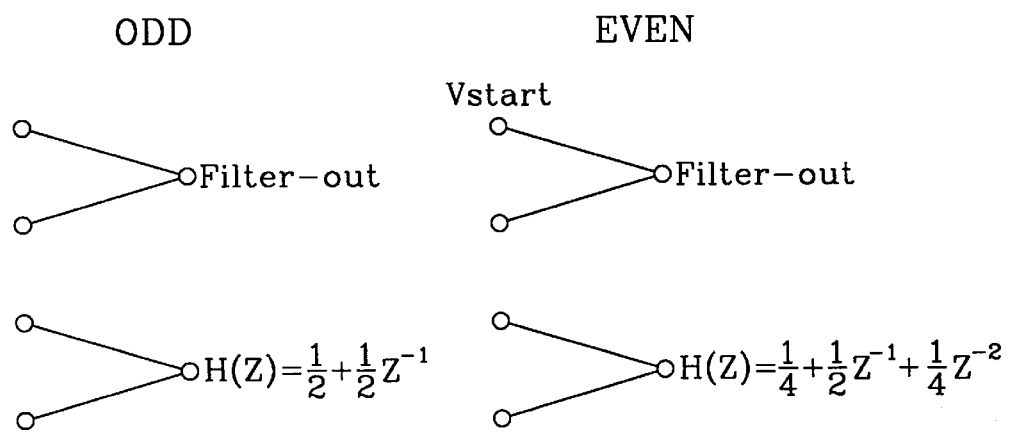
FIG. 3 is a diagram illustrating a correlation of the vertical compression according to the present invention.

FIG. 3 illustrates a correlation of odd and even vertical lines, and the output of filtering, in the case of an interlacing mode in which a vertical compression mode is ½.

Figure 4:
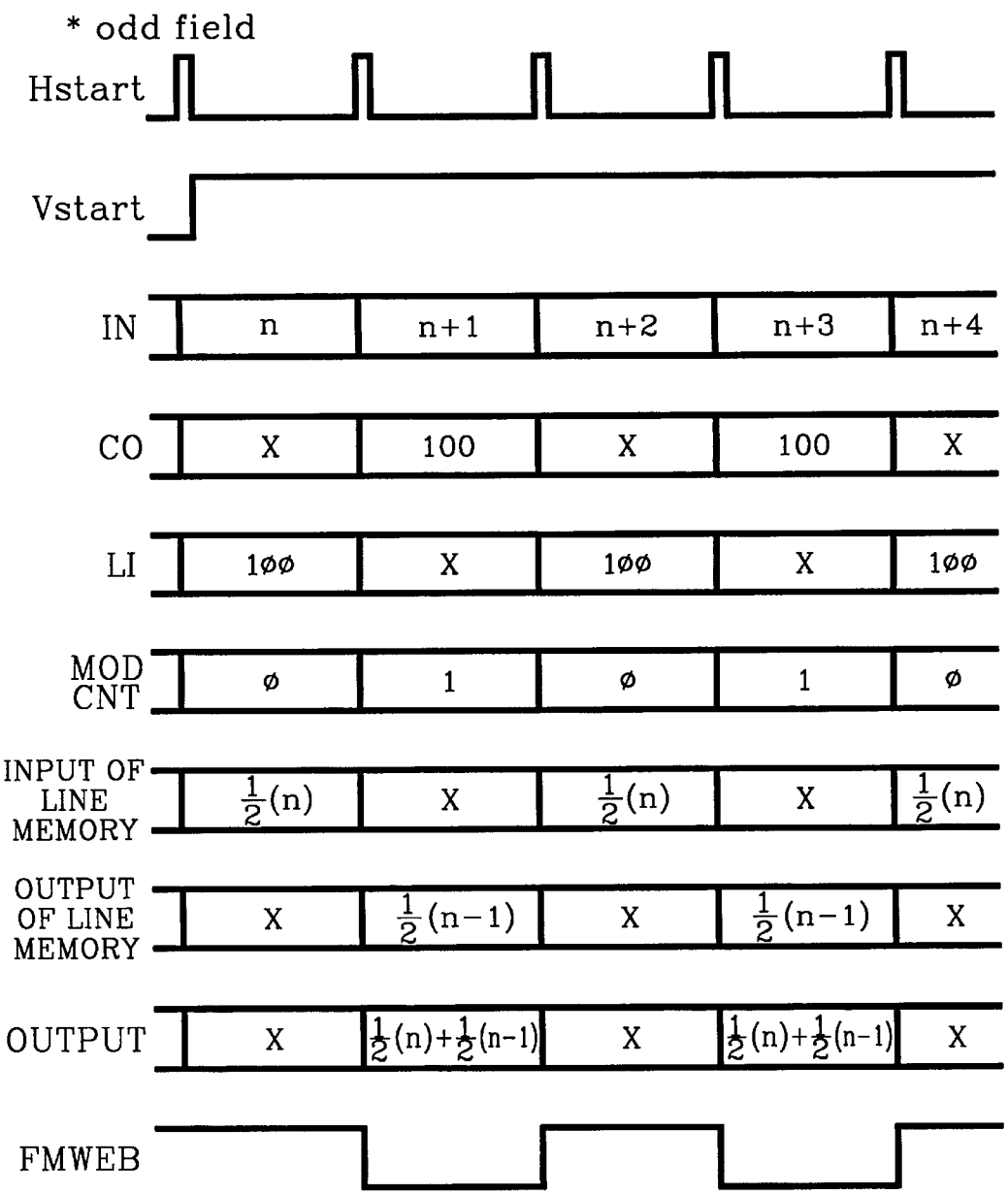
FIG. 4 is a timing chart showing the operation of the circuit shown in FIG. 2.

FIG. 4 is a timing chart showing signal relationships during the operation of the apparatus shown in FIG. 2, where the scanning mode is interlaced, the vertical compression mode is ½, and the vertical compression correlation of odd and even fields is as shown in FIG. 3.

The operation of the apparatus shown in FIG. 2 is described below in detail with reference to FIGS. 3 and 4.

Data consisting of "n" bits from a data input node IN, is input into the first and second coefficient generators 18 and 26. The first and second coefficient generators 18 and 26 generate filtering coefficients corresponding to various vertical compression modes, and send those filtering coefficients to multiplexers (e.g., MUX1 20 and MUX2 28) connected to the output nodes of each coefficient generator, respectively. The first and second coefficient generators 18 and 26 produce an output which is the result of an operation on the n-bit input data for all vertical compression modes; ¼z, ⅛z, ⅜z, ½Z, and so on. Here, the first coefficient generator 18 directly outputs the data into the final output terminal "OUTPUT". The output of second coefficient generator 26 is sent to line memory 32. This will be explained later.

Mode counter 14 counts the horizontal register start signals, HSTART, within the vertical register start signal, VSTART, which is externally input, up to as many taps as are established by the vertical compression mode signal MOD defining the vertical compression mode, and then outputs the result. For example, in cases where the number of taps is five, the mode counter 14 counts as the follows: "0→1→2→3→4→0", and when the number of taps is 2 the mode counter 14 counts as follows: "0→1→0". Mode counter 14 outputs a counting signal to CO (Coefficient Output) generator 12, and to LI (Line Memory Input) generator 16. At the same time, mode counter 14 also generates the memory line specifying signal FMWEB for designating the horizontal line registered in a video memory (not shown in the drawings).

CO generator 12, generates the first coefficient selection signal corresponding to the vertical compression mode MOD, interlaced/progressive scanning mode INTPRO, ODD/EVEN field, and mode counting signal. CO generator 12 sends the first coefficient selection signal to MUX1 20. For example, CO generator 12 will generate the first coefficient selection signal "1" if the mode count signal is "000", and it will generate the signal "⅛", if the input is "001". The first coefficient selection signal determines which, among the filtering coefficients generated by first coefficient generator 18, is to be provided to MUX1 20 to be selected. MUX1 20 selects the coefficient corresponding to a first coefficient selection signal, and outputs it to arithmetic adder 22. Adder 22 sums the outputs of MUX1 20 and line memory 32. The result is registered in a video memory after passing through the latch 24.

LI generator 16, generates the second coefficient selection signal for is selecting one of the filtering coefficients generated by the second coefficient generator 26 for each mode, according to the same signals as those supplied to CO generator 12. LI generator 16 sends the second coefficient selection signal to MUX2 28. One of the filtering coefficients output from the second coefficient generator 26 and selected to be output from MUX2 28 is sent to the line memory 32 through an adder 30.

The filtering coefficient data stored in line memory 32 is selected according to a feedback control signal FEED output from CO generator 12. The FEED signal is set to "1" when the data within the line memory can be fedback and calculated. In this state, the interlaced/progressive scanning mode INTPRO and the state of the ODD/EVEN signal can be appropriately set according to the mode counter's output. If feedback control signal FEED is a "1" an AND gate 34 will be enabled. Accordingly, the filtering coefficient data which is generated by the second coefficient generator 26 and multiplexed by MUX2 28, is added by adder an 30 to the data output from line memory 32, and the result is registered in line memory 32. If the feedback control signal FEED is "0", the data output from the line memory 32 is intercepted by the disabled AND gate and not applied to adder 30. Therefore, only the filtering coefficient data which is selected by MUX2 28 after being output from the second coefficient generator 26 is registered in line memory 32. The data output from line memory 32 is added to the output of the MUX1 20 by the adder 22. The sum output from adder 22 is registered in the video memory.

A vertical register timing is generated between odd and even fields where data is input in an interlaced form or a progressive scanning form, for maintaining the interlaced scanning. When the data is input in an interlaced mode and the vertical compression is ½, the vertical register timings, shown in FIG. 3, are generated according to the following expressions:

$$H(Z) = \frac{1}{2} + \frac{1}{2}z^{-1} \text{ and}$$

$$H(Z) = \frac{1}{4} + \frac{1}{2}z^{-1} + \frac{1}{4}Z^{-2}.$$

Here, if it is assumed that for the CO generator 12 "100→½", "010→¼", and for the LI generator 16 "100→½", "010→¼", the timing of the signals shown in FIG. 2 will be generated as shown in FIG. 4.

As described above, it is possible to simply construct the vertical compression modes for a display in interlaced scanning mode, for example, the various vertical compression filters such as ½, ⅓, ⅔ and so on, using one line memory.

In the preferred embodiment of the present invention, the FMWEB signal is generated through the mode counter, but it will be readily understood by those skilled in the art that a different structure can be used.

The present invention implements the vertical compression filter flexibly and reliably, corresponding to the various vertical compression modes, thereby simplifying its hardware construction.

It should be understood that the present invention is not limited to the particular embodiment disclosed herein as the best mode contemplated for carrying out the present invention, but rather that the present invention is not limited to the specific embodiment described in this specification, except as defined in the appended claims.

What is claimed is:

1. A vertical compression circuit for an image playback system displaying an image through interlaced scanning, comprising:

a mode counter for counting horizontal lines within one section of vertical lines based on a compression mode signal and outputting a count;

a coefficient selection signal generating unit for outputting a coefficient selection signal for selecting first and second filtering coefficients and for outputting a feedback control signal, based on the compression mode signal;

a first coefficient selecting unit for generating first coefficients corresponding to various compression modes and outputting one of the first coefficients based on the first coefficient selection signal;

a second coefficient selecting unit for generating second coefficients corresponding to various compression modes and outputting one of the second coefficients based on the second coefficient selection signal;

an adder for adding the second coefficient output from said second coefficient selecting unit to one of zero and a feedback value, based on the feedback signal to produce a sum;

a line memory unit for storing the output from the adder, wherein said adder outputs the second coefficient output from said second coefficient selecting unit if the feedback signal indicates no feedback, and said adder outputs the sum of the second coefficient output from said second coefficient selecting unit and a value previously stored in said line memory if the feedback signal indicates feedback; and a unit for adding the contents of the line memory unit and the output of the first coefficient selecting unit, and outputting a result.

2. The circuit claimed in claim 1, wherein said mode counter also outputs a memory line designating signal for designating a line stored in a video memory.

3. The circuit claimed in claim 1, wherein said unit for adding outputs the result to a line memory.

4. The circuit claimed in claim 1, wherein said coefficient selection signal is generated further based on a selected scanning mode and a field of display of the image.

5. A vertical compression circuit for an image playback system displaying an image through interlaced scanning, comprising:

means for counting horizontal lines within one section of vertical lines based on a compression mode signal and outputting a count;

means for selecting first and second filtering coefficients;

means for generating a feedback control signal based on the compression mode signal;

means for generating first coefficients corresponding to various compression modes and outputting one of the first coefficients based on the selected first filtering coefficient;

means for generating second coefficients corresponding to various compression modes and outputting one of the second coefficients based on the selected second filtering coefficient;

means for adding the second coefficient output from said means for generating second coefficients to one of zero and a feedback value, based on the feedback control signal to produce a sum;

means for storing said sum produced by said means for adding, wherein said means for adding outputs the second coefficient output from said means for generating second coefficients if the feedback signal indicates no feedback, and said means for adding outputs the sum of the second coefficient output from said means for generating second coefficients and a value previously stored in said means for storing if the feedback signal indicates feedback; and means for adding the contents of said means for storing and the output of said means for generating first coefficients, and outputting a result.

6. The circuit claimed in claim 5, wherein said means for counting also generates a memory line designating signal for designating a line stored in a video memory.

7. The circuit claimed in claim 5, wherein said means for adding the contents of said means for storing outputs the result to a line memory.

8. The circuit claimed in claim 5, wherein said means for selecting first and second coefficients selects the first and second coefficients based on a compression mode, a selected scanning mode and a field of display of the image.

9. A method for vertically compressing an image signal, comprising:

generating first coefficients based on the image signal, wherein the first coefficients correspond to coefficients for various compression modes;

generating second coefficients based on the image signal, wherein the second coefficients correspond to coefficients for various compression modes;

counting, based on a selected compression mode, occurrences of horizontal signals and outputting a count;

selecting one of the first coefficients based on the selected compression mode and the count;

selecting one of the second coefficients based on the selected compression mode and the count;

generating a feedback signal based on the count and the selected compression mode;

storing the selected second coefficient in a memory if the feedback signal indicates no feedback, and adding a feedback value to the selected second coefficient to produce a sum and storing the sum in the memory if the feedback signal indicates feedback, wherein the feedback value is a value previously stored in the memory;

adding the contents of the memory and the selected first coefficient to produce a sum and outputting the sum as a filtered signal.

10. The method claimed in claim 9, wherein said first coefficient selection signal is generated further based on a selected scanning mode and a field of display of the image.

11. The method claimed in claim 9, wherein said second coefficient selection signal is generated further based on a selected scanning mode and a field of display of the image.

* * * * *